United States Patent

Satyapal et al.

[11] Patent Number: 5,879,435
[45] Date of Patent: Mar. 9, 1999

[54] ELECTRONIC AIR CLEANER WITH GERMICIDAL LAMP

[75] Inventors: Sunita Satyapal, East Hampton; H. Harvey Michels, West Hartford, both of Conn.; William A. Faris, Syracuse, N.Y.

[73] Assignee: Carrier Corporation, Syracuse, N.Y.

[21] Appl. No.: 779,315

[22] Filed: Jan. 6, 1997

[51] Int. Cl.⁶ ..................................................... B03C 3/74
[52] U.S. Cl. ........................ 96/16; 95/74; 96/28; 96/224; 422/24
[58] Field of Search .................. 96/16, 28, 223, 96/224; 95/57, 68, 69, 74; 55/279; 422/24, 121

[56] References Cited

U.S. PATENT DOCUMENTS

| | | | |
|---|---|---|---|
| 2,418,339 | 4/1947 | Ehrgott | 55/279 X |
| 2,449,681 | 9/1948 | Wilson | 96/16 |
| 2,651,383 | 9/1953 | Yonkers, Jr. | 96/16 |
| 2,709,954 | 6/1955 | Baker | 96/16 X |
| 3,744,216 | 7/1973 | Halloran | 55/521 X |
| 4,203,948 | 5/1980 | Brundbjerg | 422/121 |
| 4,750,917 | 6/1988 | Fujii | 55/279 X |
| 5,225,000 | 7/1993 | Fujii et al. | 422/24 X |

FOREIGN PATENT DOCUMENTS

| | | | |
|---|---|---|---|
| 677658 | 1/1964 | Canada | 96/16 |
| 6-198215 | 7/1994 | Japan | 96/16 |

OTHER PUBLICATIONS

Carrier Brochure, Catalog No. 533–100, Printed in U.S.A., Form 31KAX–10SI, Dated Oct. 1, 1994, pp. 1–14, 31KAX Electronic Air Cleaners, Installation, Start–Up, And Service Instruction.

*Primary Examiner*—Richard L. Chiesa
*Attorney, Agent, or Firm*—William W. Habelt

[57] ABSTRACT

An electronic air cleaner (10) includes a housing (20), a mechanical prefilter (30), an electrostatic precipitator cell (40) and at least one germicidal lamp (50). The electrostatic precipitator cell (40) includes a plurality of collector plates (42) for collecting thereon particulate material from the air stream. The germicidal lamp or lamps (50) are disposed to irradiating the collector plates (42) and any particulate material collected thereon with germicidal light to destroy microbial growth that might occur on the particulate material deposited on the collector plates. Reflectors (60) may be provided in operative association with the germicidal lamp or lamps (50) to concentrate the germicidal light unto the collecting surface of the collector plates (42).

9 Claims, 3 Drawing Sheets

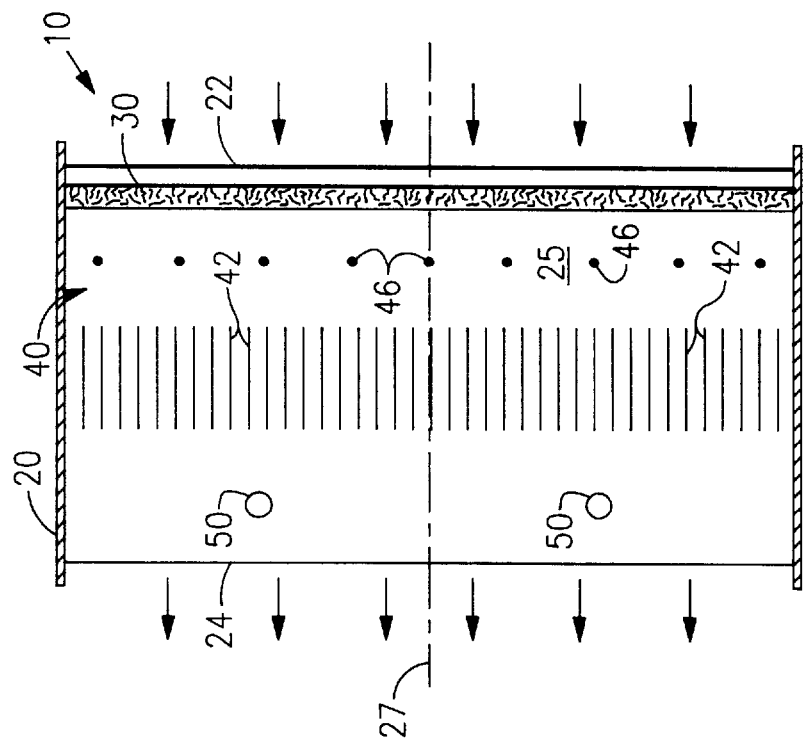
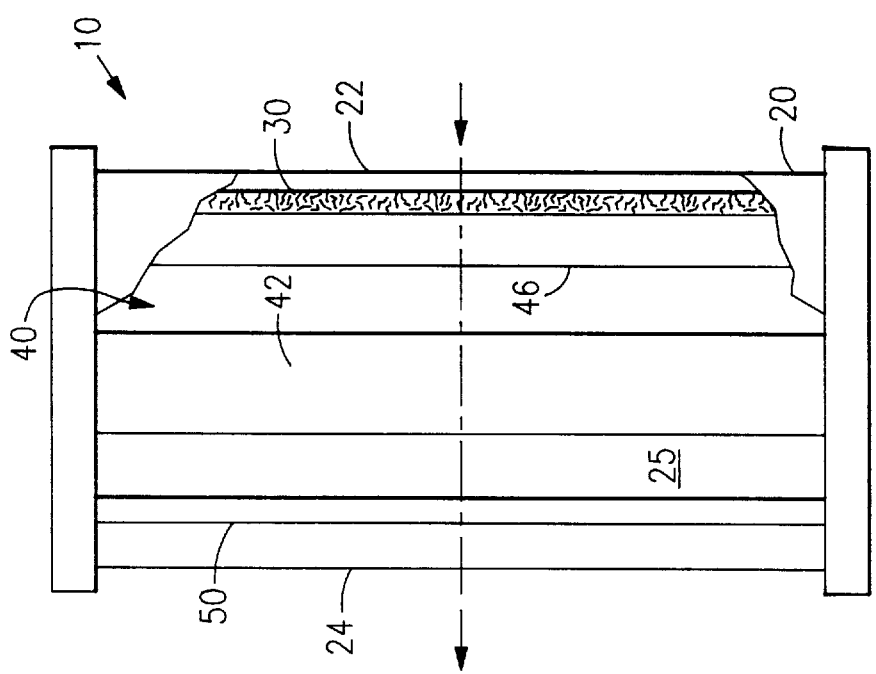

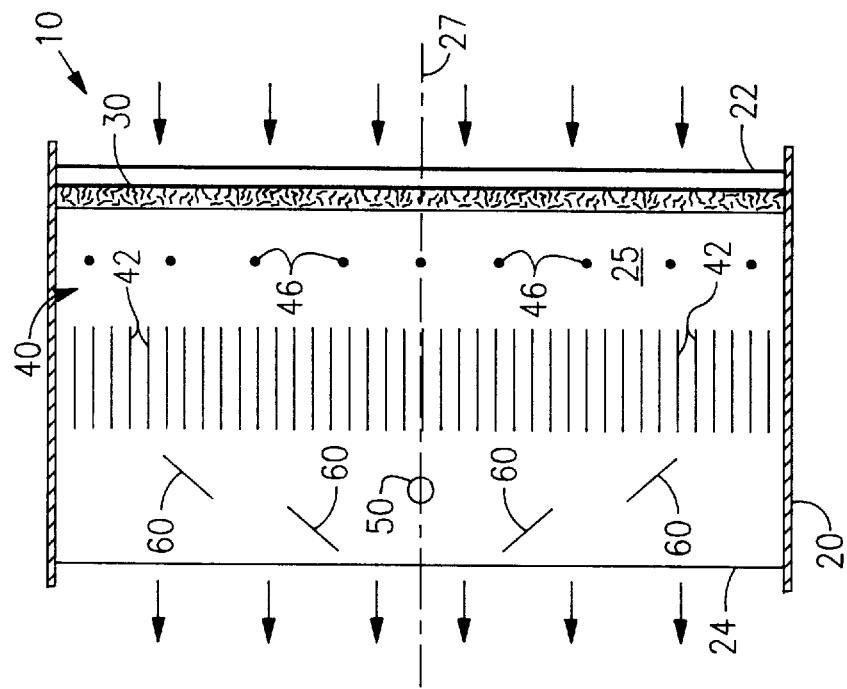
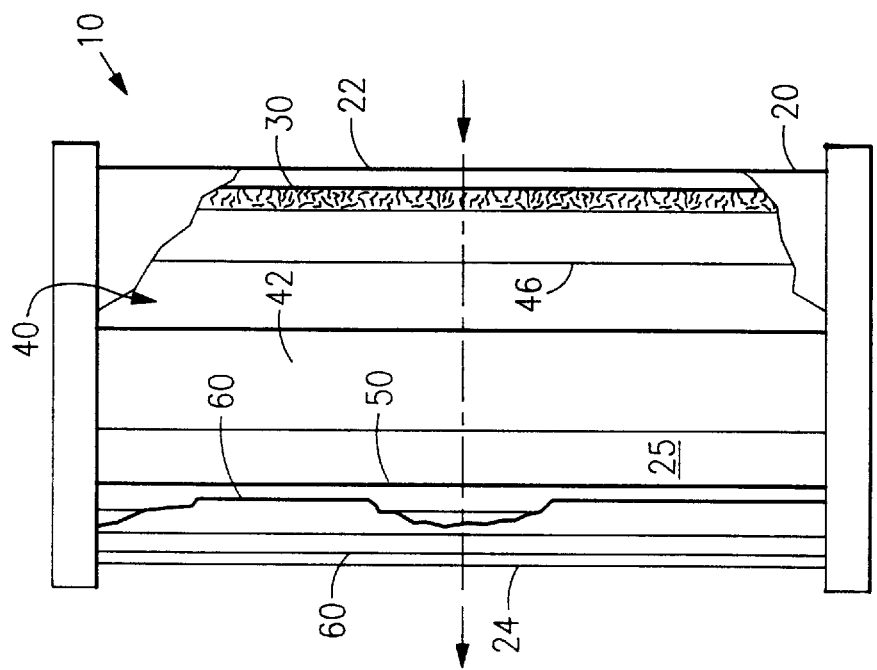

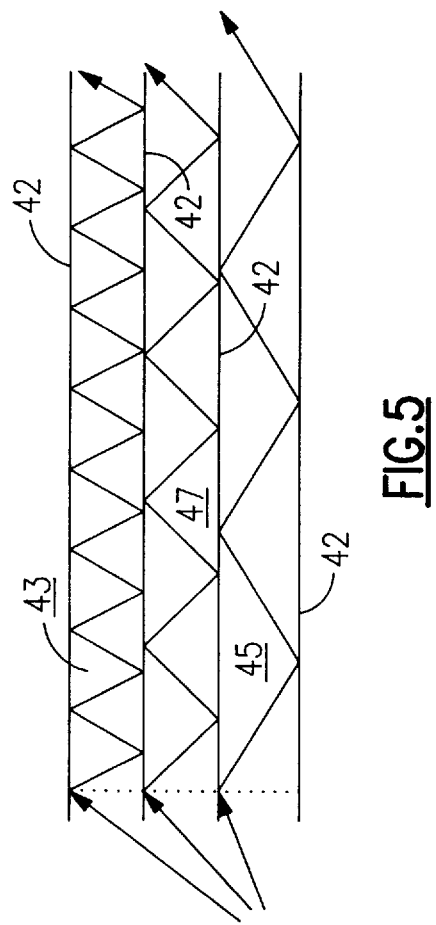
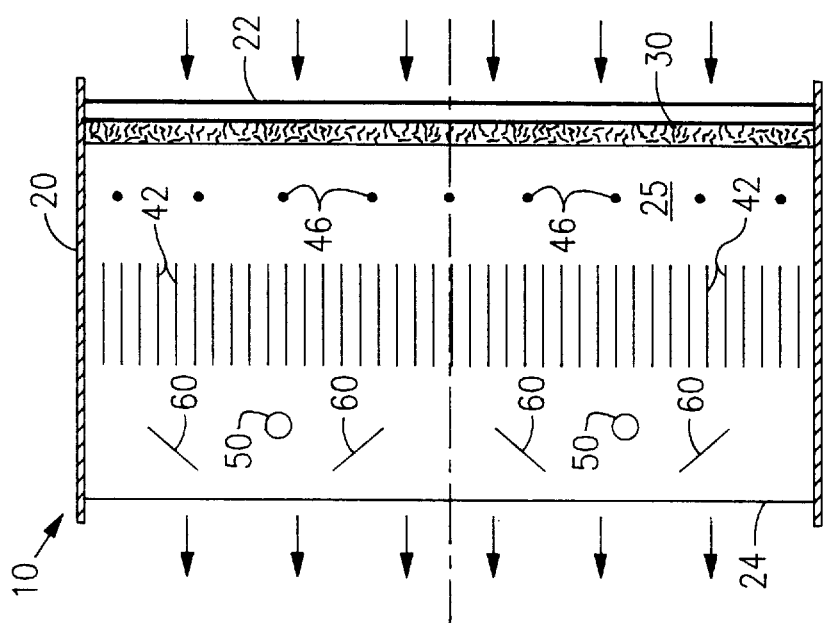

ELECTRONIC AIR CLEANER WITH GERMICIDAL LAMP

BACKGROUND OF THE INVENTION

The present invention relates generally to air purification and, more particularly, to electronic air cleaners for use with residential and light commercial forced-air heating and/or cooling systems.

Conventional commercially available electronic air cleaners, such as for example the Model 31KAX electronic air cleaner formerly marketed by Carrier Corporation, typically comprise a plurality of ionizer wires, a plurality of collector plates and an associated power circuit for supplying high voltage DC power to the ionizer wires and the collector plates. The ionizer wires are typically tungsten wires that receive a positive charge from the power source. The collector plates comprise a series of spaced, parallel plates alternately charged positive and negative by the power source. The power circuit includes a transformer for converting standard 120 volt or 240 volt alternating current power to high voltage direct current power, for example about 6,000 vdc to 12,000 vdc.

In operation, particles, including for example household and atmospheric dust, lint, animal dander, food particles, tobacco smoke, aerosols, pollen, plant spores, and the like are ionized with a positive charge as the particles pass through the electrostatic field established by the ionizing wires. The charged particles thereafter are drawn to and deposited upon the negatively charged collector plates as the air flow in which the particles are entrained passes through the array of spaced, alternatively charged collector plates. Typically, a mechanical pre-filter is disposed upstream with respect to air flow of the ionizer wires to remove larger particles, for example particles having a mean diameter greater than 10 microns. The electrostatic cell portion of the air cleaner can remove particles as small as 0.01 microns in mean diameter.

While such conventional electrostatic precipitator type air cleaners are quite effective in trapping dust and other particles on the collector plates, if the plates are not cleaned regularly to remove the deposited particles, there may be potential for microbial growth on the particles on the collector plates. If microbial growth is present and is not removed through regular thorough cleaning, there is the possibility that bioaerosols such as fungal spores, bacteria and other allergens may be re-entrained into the air stream and circulated back into the occupied enclosure.

U.S. Pat. No. 3,744,216 discloses an air cleaner for purifying air in rooms of a home, office or other building. The disclosed air cleaner includes a mechanical particulate filter, a deodorizing filter, germicidal lamps and an electrostatically enhanced media filter. The germicidal lamps comprise a pair of ultraviolet lamps for irradiating the air upstream of the electrostatically enhanced media filter to kill bacteria, fungus spores, viruses and the like. The ultraviolet lights are disposed across from each other on opposite sides of the cleaner housing and are provided with shields so as to direct the ultraviolet rays towards each other across the path of the air flowing through the air cleaner so as to irradiate the airborne microbes. Bioaersols entrained in the air stream are exposed to the germicidal light from the lamps for only the short time that the air stream is passing between the lamps. This may not be sufficient time for the air stream to be sterilized before the air stream enters the media filter. As the germicidal light is not directed upon the media filter itself, bacterial growth may occur in the media filter and on the particulate collected in the filter.

SUMMARY OF THE INVENTION

It is an object of the present invention to prevent microbial growth on the collector plates of an electronic cleaner.

It is a further object of the apparatus aspect of the present invention to provide an electronic air cleaner having germicidal lamps for irradiating the collector plates.

It is a further object of the method aspect of the present invention to provide a method of preventing microbial growth on the collector plates of an electronic air cleaner by irradiating the collector plates with germicidal light.

In accordance with the apparatus aspect of the present invention, an air clearer having an electrostatic precipitator cell including a plurality of collector plates for collecting thereon particulate material from the air stream and having at least one germicidal lamp for irradiating the collector plate or plates and any particulate material collected thereon with germicidal light. The light from the germicidal lamp or lamps, advantageously ultraviolet light having a wavelength in the range of 200 to 280 nanometers (nm), and optimally from 245 to 265 nm, is effective not only in killing microbes entrained in the air stream, but also in killing microbial growth that might occur on the plates and on the particulate material deposited on the collector plate or plates. Reflectors may be provided in operative association with the germicidal lamp or lamps to concentrate the germicidal light unto the collecting surface of the collector plate or plates.

In accordance with the method aspect of the present invention, germicidal light, advantageously ultraviolet light having a wavelength in the range of 200 to 280 nanometers (nm), and optimally from 245 to 265 nm, is directed upon the collector surface and the particulate material deposited upon the collector surface of an electrostatic precipitator cell to prevent the buildup of microbes on the particulate material deposited thereon. The germicidal light is also effective in killing microbes entrained in the air passing through the electrostatic precipitator cell.

BRIEF DESCRIPTION OF THE DRAWINGS

Further objects and advantages of the present invention will be apparent from the following description of an exemplary embodiment of the present invention wherein reference is made to the accompanying drawings, wherein:

FIG. 1 is a side elevation view, partly in section, of an electronic air cleaner provided with a plurality of germicidal lamps in accordance with a first embodiment of the present invention;

FIG. 2 is a plan view of the electronic air cleaner illustrated in FIG. 1;

FIG. 3 is a side elevation view, partly in section, of an electronic air cleaner provided with a single germicidal lamp in accordance with a second embodiment of the present invention;

FIG. 4 is a plan view of the electronic air cleaner illustrated in FIG. 3,

FIG. 5 is a diagrammatic illustration of the reflection of germicidal light rays between neighboring collector plates; and FIG. 6 is a plan view of an alternate embodiment of the multiple lamp embodiment of the electronic air cleaner of the present invention of FIG. 1.

DETAILED DESCRIPTION OF A PREFERRED EMBODIMENT

The present invention is described herein incorporated in an electronic air cleaner of the type commonly installed in connection with residential central air cooling and heating systems. It is to be understood, however, that the particular embodiments described herein are meant to be exemplary and that present invention may be used in connection with electronic air cleaners for other applications such as, for example, portable room air cleaners, office air purification systems, central air cooling and/or heating systems for commercial buildings, hospitals, schools, libraries, museums and other buildings.

Referring now to the drawings, there is depicted therein an electronic air cleaner 10 having a housing 20, a mechanical prefilter 30, an electrostatic precipitator cell 40 and, in accordance with the present invention, at least one germicidal lamp 50. The housing 20 has an air stream inlet 22, an air stream outlet 24 and an air flow passageway 25 extending therebetween. Air from the enclosure enters the air cleaner 10 through inlet 22, traverses the air flow passageway 25, and exits the air cleaner 10 through outlet 24. In a residential central air heating and/or cooling system, the electronic air cleaner 10 may be installed upstream with respect to air flow of the induced flow fan (not shown) such that the air flow is drawn through the air cleaner 10 and thence into the furnace or air conditioner of the system.

The electrostatic precipitator cell 40 exemplifies a conventional electrostatic precipitator cell of the type commonly used in prior art electronic air cleaners for use in residential central air heating and cooling systems, such as the Model 31KAX series formerly commercially available from Carrier Corporation. A detailed description of such an electronic air cleaner is presented in the Installation, Start-up and Service Instruction brochure, Form 31KAX-10SI, Catalog No. 533-100, available from Carrier Corporation, which is incorporated herein by reference. The electrostatic precipitator cell 40 comprises a plurality of alternately charged collector plates 42 disposed in spaced relationship in a parallel array axially aligned with the central axis 27 through the air flow passageway 25. The collector plates 42 are alternately positively charged and negatively charged by a power supply. The collector plates 42 are constructed of a conductive metal, such as aluminum or steel, and have a relatively high surface reflexivity. For example, on the model 31KAX020 electronic air cleaner formerly marketed by Carrier Corporation for use in connection with gas-fired residential hot air furnaces, the collector plates are about four inches by seventeen inches in dimension and are disposed in a parallel array at spacings of about ¼ inch.

The electrostatic precipitator cell 40 also includes a plurality of ionizer wires 46 disposed at spaced intervals cross the width of the housing with one ionizer wire disposed intermediate each pair of neighboring collector plates 42 and positioned axially upstream with respect to air flow of the array of collector plates 42. The ionizer wires 46 conventionally comprise tungsten wires that receive a positive charge from the power supply pack. Each of the ionizer wires 46 generates a positive corona discharge across the electrostatic precipitator cell 40 upstream of the array of collector plates 42 so that dust particles entrained in the air flow passing through the air flow passageway 25 receive a positive electric charge. When these positively charged dust particles subsequently traverse the array of collector plates 42, the positively charged dust particles are directed toward and collected on the negatively charged collector plates. In the aforementioned model 31KAX020 electronic air cleaner, the ionizer wires are disposed in a row positioned about ¾ inch upstream of the leading edge of the array of collector plates and are spaced in that row at about 1¼ inch intervals.

As in conventional electrostatic precipitator cells, a conventional type power supply (not shown) is provided having a supply circuit including a device for converting standard 120 volt or 240 volt alternating current power to high voltage direct current power. The output of the power supply pack may range from 6000 vdc to 12000 vdc depending upon the application, but typically is in the range of 7000 vdc to 7500 vdc for residential applications.

A mechanical filter 30 may be disposed adjacent the inlet 22 upstream of the electrostatic precipitator cell 40 to prefilter the air stream passing into the air cleaner 10 to remove large particles. The mechanical filter 30 may be a media filter, a fabric filter or other type of conventional mechanical filter. For example, the mechanical filter 30 may comprise an expanded aluminum mesh filter that is functional to remove relatively large particles, such as lint, pollen and other particles having a mean particle diameter greater than about 10 microns, prior to the air flow entering the electrostatic precipitator cell 40. The depth of the mechanical filter 30 in the axial direction, i.e. in the direction of air flow along the central axis 27, as well as the density of the mesh media, are selected to provide a desired particulate collection efficiency while ensuring a pressure drop that is below a desired maximum design pressure drop at normal air flow capacity. Additionally, a device for removing odors and volatile organic compounds (VOC's), such as for example an activated carbon filter, (not shown) may be disposed in the air flow passageway 25 at a location adjacent the outlet 24 of the air cleaner.

The electronic air cleaner 10 of the present invention includes at least one germicidal lamp 50 operative to emit germicidal light, such as for example ultraviolet light having a wavelength in the range of 200 to 280 nanometers (nm), and optimally from 245 to 265 nm. The germicidal lamp or lamps 50 are disposed within the housing 20 so as to irradiate the surface of the collector plates 42 with germicidal light. Advantageously, the germicidal lamp or lamps 50 are disposed downstream with respect to air flow of the electrostatic precipitator cell 40 and upstream of any additional devices, such as an activated carbon filter, that might be disposed in the gas flow passageway 25 So positioned, the lamp or lamps 50 will not be exposed to the higher particulate loadings in the gas flow upstream of the electrostatic precipitator cell 40 and the potential clouding of the lamps due to particulate buildup thereon. Further, positioned downstream of the electrostatic precipitator cell 40, the lamps will not interfere with and distort the distribution of the air flow entering the electrostatic precipitator cell 40. Nevertheless, if circumstances dictate, the germicidal lamp or lamps 50 may be positioned upstream of the electrostatic precipitator cell 40 so long as the germicidal light emitted therefrom is directed so as to irradiate the surface of the collector plates 42.

In one embodiment of the electronic air cleaner 10 of the present invention, as illustrated in FIGS. 1, 2 and 6, a pair of laterally spaced germicidal lamps 50 are disposed within the housing 20 downstream with respect to air flow of the electrostatic precipitator cell 40. One of the germicidal lamps 50 is laterally displaced to one side of the central axis 27 through the air flow passage 25, while the other of the germicidal lamps 50 is laterally displaced to the other side of the central axis 27 through the air flow passage 25. With the paired germicidal lamps 50 positioned in this manner, that is positioned off center from the central axis 26 of the air flow passageway 25, most of the rays of germicidal light from the lamps 50 will first impinge upon the respective collector plates 42 at angle of incidence. As a result, the respective rays of germicidal light will be reflected again and again between the opposed surfaces of neighboring collector plates 42 as the respective rays of germicidal light traverse the gap between a respective pair of neighboring collector plates 42 as shown in FIG. 5. Collector plates made of aluminum will typically have a high reflectivity over the required wavelength range. Collector plates formed from lower reflectivity metal, for example steel collector plates, may need to be coated with a reflective material to increase the reflectivity of the collector plates.

The repeated reflection of the germicidal light rays between the opposed surfaces of neighboring collector plates will ensure that the entire surface area of each collector plate is bathed with germicidal light. As illustrated in FIG. 5, the number of reflections generated is dependent upon the angle of incidence of the germicidal light incoming into the array of spaced collector plates 42. Measuring the angle of incidence from the perpendicular to the plate, for small angles of incidence, as illustrated in the air flow passage 43, there will be a larger number of reflections between the plates. With a larger number of reflections, there is greater direct contact of the germicidal light with the collecting surface of the plates as the light traverses the plates, but the intensity of the light will decrease to a greater extent as the light traverses the air flow passage between the plates due to the larger number of reflections. On the other hand, for large angles of incidence, as illustrated in the air flow passage 45, there will be a smaller number of reflections between the plates. With a smaller number of reflections, there is less direct contact of the germicidal light with the collecting surface of the plates as the light traverses the plates, but the intensity of the light will decrease to a lesser extent as the light traverses the air flow passage between the plates. With a moderate angle of incidence, as illustrated in the air flow passage 47, there will be a moderate number of reflections and only a moderate decrease in the intensity of the light as it traverses the air flow passage between the plates.

Referring now to FIGS. 3 and 4, there is depicted another embodiment of the electronic air cleaner 10 of the present invention including a single germicidal lamp 50. As illustrated, the single germicidal lamp 50 is disposed within the housing 20 along the central axis 27 of the air flow passageway 25 at a location spaced downstream from the electrostatic precipitator cell 40. To improve the distribution of the germicidal light emitted from the single lamp 50 across the lateral expanse of the electrostatic precipitator cell 40, at least one, and advantageously a series of reflectors 60, may be provided in operative association with the germicidal lamp 50 for reflecting those rays of germicidal light originally emitted from the germicidal lamp 50 but initially directed away from the collector plates 42. The reflectors 60 are made of a reflective material, such as aluminum or steel, or are otherwise provided with a highly reflective surface. Although the particular shape and dimensions of the reflectors 60 may vary depending upon application, the reflectors 60 may typically comprise rectangular plates having a longitudinal dimension that approximately corresponds to the longitudinal dimension of the collector plates and that are aligned with their longitudinal axis parallel to the longitudinal axis of the collector plate array, but disposed with their lateral axis at an angle to the central axis 27 of the flow passage 25, as illustrated in FIGS. 4, to facilitate reflection of the germicidal light unto the face surfaces of the collector plates 42. The reflectors 60 may comprise flat plates or may comprise accurate plates having a curvature designed to further direct and concentrate the reflected germicidal light rays upon the collector plates.

The reflectors 60, which advantageously are, as depicted, disposed downstream with respect to air flow and laterally spaced from the lamp 50, serve to redirect these rays towards the collector plates 42, disposed upstream with respect to air flow past the lamp 50, thereby increasing the overall level of germicidal light radiating upon the collector plates 42. The reflectors 60 also reflect the germicidal light rays to impinge against the collecting surface of the respective collector plates at a wider variety of angles of incidence, whereby multiple reflections at a variety of angles of incidence will occur between the opposed surfaces of neighboring collector plates as hereinbefore discussed and illustrated in FIG. 5.

It is to be understood that reflectors may also be used in connection with the multiple germicidal lamp embodiment of the electronic air cleaner 10 of the present invention. A pair of reflectors 60 could be disposed downstream with respect to air flow past and in operative association with each of the germicidal lamps 50 of the multiple germicidal lamp embodiment, with the reflectors oriented to reflect germicidal light rays back toward the collector plates 42, as for example depicted in FIG. 6. Again, the use of reflectors 60 will result in multiple reflections at a variety of angles of incidence occurring between the opposed surfaces of neighboring collector plates as hereinbefore discussed and illustrated in FIG. 5. Additionally, in either the single lamp or multiple lamp embodiments, providing a high reflectivity surface on the downstream surface 33 of the mechanical filter 30 will reflect germicidal light that has traversed the array of collector plates 42 being redirected back at the collector plates 42. Advantageously, the mechanical filter 30 may comprise a mesh filter wherein the mesh fiber comprises aluminum, steel or other high reflectivity material. Additional reflectors (not shown) may be positioned upstream of the electrostatic precipitator cell 40 at a location downstream of the mechanical filter 30 to redirect rays of germicidal light that have traversed the array of collector plates 42 back at the collector plates 42.

In operation, when the power supply is activated to charge the collector plates 42 and the ionizer wires 46, particles entrained in the air flow passing through the electronic air cleaner 10 will be captured on the collecting surfaces of the collecting plates 42. As the particles entrained in the air are captured, layers of particulate will buildup over time on the collecting surfaces of the collector plates 42. In a conventional residential hot air heating system installation, the electrostatic precipitator cell 40 is not operated continuously, but rather is only operated when air flow is passing therethrough, that is when the system furnace is actually in operation or the system fan is operating to circulate air. In carrying out the present invention, the germicidal lamp or lamps 50, as the case may be, may be operated in a mode in which the lamp or lamps 50 illuminate the collector plates 42 when the electrostatic precipitator cell 40 is in operation or in a mode in which the lamp or lamps 50 illuminate the collector plates 42 only at a time when the electrostatic precipitator cell 40 is not in operation. When the lamp or lamps 50 are operated in concert with the electrostatic precipitator cell 40, the collector plates 42 are bathed with germicidal light as the particulate material builds up on the collector plates 42. As in conventional systems employing germicidal light, the air passing through the system would also be disinfected by the germicidal light.

What is claimed is:

1. An air cleaner for removing particulate material that is entrained in an air stream passing therethrough, comprising:
   a housing having an air stream inlet, an air stream outlet, and defining a flow passage therebetween;
   an electrostatic precipitator cell for removing particulate material from the air stream, said electrostatic precipitator cell including a plurality of collector plates disposed within the flow passage for collecting thereon particulate material from the air stream; and at least one germicidal lamp operative to emit germicidal light, said at least one germicidal lamp disposed within said housing axially downstream with respect to the air flow of said collector plates and positioned for irradiating the collector plates with germicidal light at an angle of incidence.

2. An air cleaner as recited in claim 1 wherein said at least one germicidal lamp is operative to emit ultraviolet light.

3. An air cleaner as recited in claim 1 further comprising at least one reflector disposed in operative association with said at least one germicidal lamp for further directing germicidal light emitted from said at least one germicidal lamp upon said collecting plates at an angle of incidence.

4. An air cleaner as recited in claim 3 wherein said at least one germicidal lamp is operative to emit ultraviolet light.

5. An air cleaner for removing particulate material that is entrained in an air stream passing therethrough, comprising:

a housing having an air stream inlet, an air stream outlet, and defining a flow passage having an axis extending therebetween;

an electrostatic precipitator cell for removing particulate material from the air stream, said electrostatic precipitator cell including a plurality of collector plates disposed in spaced relationship in a parallel array disposed in the flow passage and aligned parallel to the axis of the flow passage, a plurality ofionizer wires disposed in spaced relationship in a row positioned in the flow passage axially upstream with respect to air flow of said collector plates, and a power supply for providing an electrical charge to said ionizer wires and for providing positive and negative charges respectively to alternate collector plates of said array; and at least one germicidal lamp operative to emit germicidal light, said at least one germicidal lamp disposed within said housing axially downstream of said array of collector plates and positioned to irradiate said collector plates with ultraviolet light at an angle of incidence.

6. An air cleaner as recited in claim 5 wherein said at least one germicidal lamp comprises a single germicidal lamp disposed on the axis of the flow passage.

7. An air cleaner as recited in claim 6 further comprising at least one pair of reflectors disposed in operative association with said single germicidal lamp for farther directing germicidal light emitted from said germicidal lamp to irradiate upon said collecting plates at an angle of incidence.

8. An air cleaner as recited in claim 5 wherein said at least one germicidal lamp comprises a pair of germicidal lamps disposed in spaced relationship on opposite sides of the axis of the flow passage.

9. An air cleaner as recited in claim 8 farther comprising at least a pair of reflectors disposed in operative association with each of said germicidal lamps for further directing germicidal light emitted from said germicidal lamps to irradiate upon said collecting plates at an angle of incidence.

* * * * *